United States Patent
Billaud

(10) Patent No.: US 7,936,300 B2
(45) Date of Patent: May 3, 2011

(54) METHOD FOR REDUCING MULTIPATH PROPAGATION EFFECTS DURING THE PROCESSING OF REPLIES IN MODE "S"

(75) Inventor: Philippe Jean Billaud, Fontenay Aux Roses (FR)

(73) Assignee: Thales, Neuilly-sur-Seine (FR)

(*) Notice: Subject to any disclaimer, the term of this patent is extended or adjusted under 35 U.S.C. 154(b) by 0 days.

(21) Appl. No.: 12/518,770

(22) PCT Filed: Dec. 5, 2007

(86) PCT No.: PCT/EP2007/063370
§ 371 (c)(1),
(2), (4) Date: Aug. 7, 2009

(87) PCT Pub. No.: WO2008/071607
PCT Pub. Date: Jun. 19, 2008

(65) Prior Publication Data
US 2010/0026553 A1 Feb. 4, 2010

(30) Foreign Application Priority Data
Dec. 12, 2006 (FR) ...................................... 06 10815

(51) Int. Cl.
*G01S 13/76* (2006.01)
(52) U.S. Cl. ................. 342/37; 342/40; 342/39; 342/32
(58) Field of Classification Search .............. 342/29–40, 342/43, 46
See application file for complete search history.

(56) References Cited

U.S. PATENT DOCUMENTS
5,063,386 A 11/1991 Bourdeau et al.
(Continued)

FOREIGN PATENT DOCUMENTS
EP 0 426 543 A1 5/1991
(Continued)

OTHER PUBLICATIONS
Gaspare Galati et al., "Decoding Techniques for SSR Mode S Signals in High Traffic Environment", Radar Conference, Oct. 2005, pp. 399-402.
(Continued)

*Primary Examiner* — John B Sotomayor
(74) *Attorney, Agent, or Firm* — Baker Hostetler LLP

(57) ABSTRACT

The processing method according to the invention is a method of processing replies from targets interrogated by a surveillance radar according to a mode S interrogation of all the targets present in the receiving lobe of the radar, whereby the different targets present in the receiving lobe of the radar are interrogated at least once, the set of the mode S reply signals received for this lobe are collected after each interrogation, a reply detection processing operation is performed for each target and errors are detected and, if necessary, corrected then the corresponding blips are extracted, and this method is characterized in that said signal quality detection and determination processing operation consists in forming a synthetic message with the set of replies to each interrogation for each target, establishing, for each bit of the message, the value and the quality of this bit and performing the error detection and correction using this synthetic message, and the three variables $\Sigma$, $\Delta$ and monopulse of all the failed replies from the same target are exploited to construct the synthetic message.

This processing operation is useful in highly polluted electromagnetic environments where the existing methods are inadequate: the same target may be asked the question again for reasons other than a reply failure.

10 Claims, 7 Drawing Sheets

U.S. PATENT DOCUMENTS

| | | | |
|---|---|---|---|
| 5,182,563 A * | 1/1993 | Blinchikoff et al. | 342/32 |
| 5,220,329 A * | 6/1993 | Verbeke et al. | 342/40 |
| 5,317,317 A | 5/1994 | Billaud et al. | |
| 5,341,139 A | 8/1994 | Billaud et al. | |
| 5,406,288 A | 4/1995 | Billaud et al. | |
| 5,432,517 A | 7/1995 | Billaud et al. | |
| 5,455,586 A * | 10/1995 | Barbier et al. | 342/37 |
| 5,528,244 A * | 6/1996 | Schwab | 342/37 |
| 5,825,322 A | 10/1998 | Capozoli | |
| 5,835,059 A | 11/1998 | Nadel et al. | |
| 6,856,274 B1 * | 2/2005 | Johnson | 342/32 |
| 7,408,497 B2 | 8/2008 | Billaud et al. | |
| 7,471,235 B2 * | 12/2008 | Ootomo et al. | 342/37 |
| 2004/0046687 A1 * | 3/2004 | LaFrey et al. | 342/33 |
| 2005/0156777 A1 * | 7/2005 | King et al. | 342/29 |
| 2006/0119502 A1 * | 6/2006 | Ootomo et al. | 342/37 |
| 2007/0252750 A1 | 11/2007 | Jean et al. | |
| 2008/0231493 A1 | 9/2008 | Billaud et al. | |
| 2008/0238758 A1 * | 10/2008 | Billaud et al. | 342/32 |
| 2010/0026553 A1 * | 2/2010 | Billaud | 342/37 |

FOREIGN PATENT DOCUMENTS

| | | |
|---|---|---|
| EP | 0 577 480 A1 | 1/1994 |
| EP | 1 316 817 A2 | 6/2003 |
| EP | 1 635 189 A1 | 3/2006 |
| EP | 1 640 743 A2 | 3/2006 |
| FR | 2 860 882 A1 | 4/2005 |
| WO | WO 2005/085898 A1 | 9/2005 |

OTHER PUBLICATIONS

Shi-Yi Chen et al., "Error Correcting Cyclic Redundancy Checks based on Confidence Declaration", 6th International Conference on ITS Telecommunications Proceedings, Jun. 2006, pp. 511-514.

W. Harman et al., "Techniques for Improved Reception of 1090 MHZ ADS-B Signals", Digital Avionics Systems Conference, Oct. 1998, pp. G25-1-G25-9, vol. 2, The AIAA/IEEE/SAE, Bellevue WA, USA.

* cited by examiner

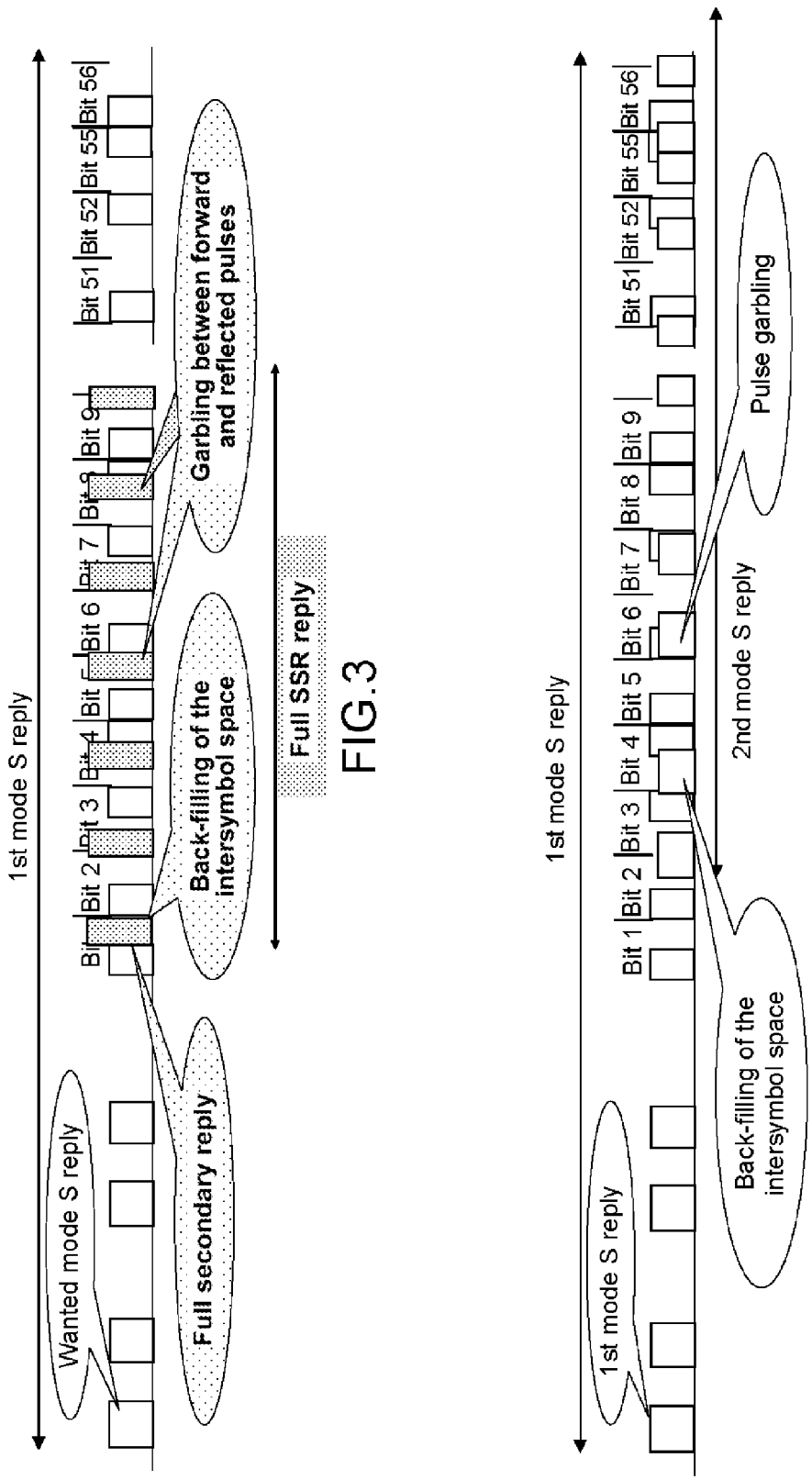

METHOD FOR REDUCING MULTIPATH PROPAGATION EFFECTS DURING THE PROCESSING OF REPLIES IN MODE "S"

CROSS-REFERENCE TO RELATED APPLICATIONS

This application is a national stage of International Application No. PCT/EP2007/063370, filed Dec. 5, 2007, which claims priority to foreign French Application No. FR 0610815, filed Dec. 12, 2006, the disclosure of each application is hereby incorporated by reference in their entirety.

BACKGROUND OF THE INVENTION

1. Field of the Invention

The present invention relates to a method of reducing multipath propagation effects when processing detection mode "S" replies from targets such as aircraft, by secondary surveillance radars (commonly called SSR).

2. Description of Related Art

In some radar signal echo reception cases, this reception can be polluted by spurious signals due to strong multipaths in different directions. In these conditions, the known current mode S signal processing operations cannot correctly process the mode S replies. This results in unacceptable aircraft detection losses.

It should be recalled here that the principle of the mode S is the selective interrogation of aircraft by exploiting the monopulse information in order, in a single interrogation in the lobe, to "locate" and "decode" with virtual certainty (calculation of a CRC, that is, a cyclic redundancy code) the message transmitted by the onboard transponder. Algorithms have therefore been developed to this end that therefore allocate all the aim to the processing of a reply.

The characteristics of the Mode S standard (ICAO standard, Annexe 10) are:

The main objective is to perform the detection and location (in 3D: azimuth, distance, altitude) of an aircraft in a single interrogation. Thus, EUROCONTROL, just like the STNA in France, have defined a metric: the number of interrogations per radar antenna revolution and per aircraft, in addition to the probability of detection. It can thus be seen that, in addition to the conventional radar performance, the manner in which it is obtained is deemed important (efficiency indicator), The mode S reply (see a simplified example in FIG. 1) is, by construction, much longer (64 μs or 120 μs) and denser than the SSR reply (21 μs) and consequently more sensitive to the multipaths: the space between two mode S pulses is either 500 ns or 1 μs, whereas it is of the order of 1 μs, 2.45 μs, 3.45 μs, . . . for an SSR reply. Therefore, the probability that a multipath of a reply will pollute the pulses of that same reply is much higher in mode S than in SSR.

The data exchanged between the ground and the onboard system must be reliable: an error rate of $10^{-7}$ is required by the mode S station specification according to the EUROCONTROL standard. For this, the standard has provided an error correcting code (24-bit CRC) that makes it possible to detect whether the message is corrupted. This code has been designed as a reply to the garbling between conventional secondary replies (21 μs in duration, no more than fourteen 450 ns pulses polluted, or on average eight pulses polluted per reply, distributed over 21 μs).

In practice, to meet the exchanged data security requirements, the correction is carried out on at most 10 bits spaced apart by less than 24 μs in the mode S message. Thus, an SSR reply that is richer in pulses than the average (code having more than six pulses out of the possible twelve), can pollute more than 10 bits of the mode S message, and consequently render a mode S reply uncorrectable (see FIG. 2).

The signal processing handles both the decoding of the mode S reply and the marking of the bits of the message (1 bit lasts 1 μs) that may be errored (poor quality). According to the principle of the mode S standard, it is only these marked bits that can be used for the correction by the error correcting code.

This concept, implemented in a particular propagation environment, faced with "garblings" (spurious signals that evolve from interrogation to interrogation because of the selectivity of the interrogation, is fully operational. In the presence of strong multipaths, which remain by definition "glued" to the reply, the concept no longer stands up: each reply is analyzed and rejected independently of the other.

In practice, with the currently known methods, the mode S replies received are systematically self-polluted for each multipath:

by the "on line" reflections (in the axis of the antenna)
and/or "laterally" (slightly offset from the axis of the antenna).

The processing of the mode S signal is optimized for the processing of a reply for each lobe, and therefore the decoding and the correction of the message are performed on a single reply. When there is a failure, a new interrogation is automatically sent and once again the signal processing function (hereinafter simply called TS) exploits the new reply. In the presence of multipaths, the failure is repeated. As long as the target is in the receiving lobe of the radar and the reply has not been able to be decoded, a new interrogation is generated. Therefore, when the multipaths are strong, the number of selective interrogations for a polluted target can, ultimately, be equal to that which would be produced by the secondary processing in non-selective mode. However, since the decoding decision it taken on each reply, there is global failure throughout the lobe.

The devices of the prior art were focused mainly on the signal processing (TS) to best perform the decoding and quality assignment functions since then, through the mode S standard, the error detection method and the effectiveness of the correction were imposed by the code employed and the false corrections rate required.

For each reply, the TS exploits the information available at the output of the receiver, which is linked to the radar antenna, namely:

the power detections on the SUM and DIFFERENCE pathways,
the phase information representing the misalignment of the target in the lobe (information called "monopulse" and referred to as such hereinafter).

With reference to FIGS. 3 to 5, there now follows a description of three typical cases of pollution of the mode S reply:

by SSR fruits,
by synchronous mode S replies,
by multipaths of the mode S reply.

The correction principle described hereinabove does not withstand certain extreme configurations encountered on different radar sites, three exemplary (but nonlimiting) cases of which can be taken:

in the case of FIG. 3, encountered in Northern Europe: in an environment polluted by numerous asynchronous secondary replies (called "fruits"), it is probable that from one mode S selective interrogation to the next the associated replies will be polluted each time by an SSR-fruit reply of significantly higher power than the mode S reply (case of a wanted target at a great distance of 470 km and of fruit generated by targets close to the radar concerned, but replying to a distant radar). The fruits, being asynchronous, provoke errors on different bits from one mode S reply to the next. FIG. 3 shows, at the start of the time line, the four unpolluted mode S reply preamble pulses. Then come the data bits (referenced bit 1 to bit 56 in the figure), the first of which are polluted by spurious pulses from a full-code SSR reply (shown shaded in the figure, and with an amplitude greater than that of the wanted bits) arriving asynchronously in relation to the wanted pulses. Such spurious pulses are just as likely to back-fill the intersymbol spaces as they are to overlap more or less significantly the forward pulses.

A second case is illustrated by FIG. 4. The pollution is due to synchronous spurious replies originating from different aircraft for interrogations from one and the same radar. In the mode S reply acquisition phase ("All Call") in an environment filled with targets such as a Northern European air corridor, the wanted mode S replies are mutually polluted synchronously. The false bit rate depends on the mutual overlap rate of the mode S replies. From recurrence to recurrence, the errored bits may not always be the same because of beats between the signals of different frequencies. Thus, in the case of FIG. 4, while a radar begins to receive a mode S reply from a first aircraft, a reply originating from a second aircraft begins to arrive from the second data bit of the first reply. The four synchronization pulses are such that the first of them is placed between the second and the third pulses of the first reply, whereas the other three overlap the bit 3 to bit 7 pulses of the first reply in different ways, because the respective distances of the synchronization pulses are not the same as those of the data pulses. Then, the data pulses of the second reply overlap the data pulses of the first.

FIG. 5 relates to the case of a multipath propagation of one and the same reply. In the presence of strong multipaths, when the TS decodes bits badly, the bits can be distributed anywhere in the reply since, by nature, the multipath can pollute all the bits of the message. In practice, since the multipaths are the same reply repeated and offset in time by a duration that can be as much as 3 μs, the badly decoded bits depend on the message itself and on the beats of the signals (direct reply and reply from multipaths) in the receiver, which distorts the pulses at the output of the receiver. Consequently, the TS which exploits the received power, may wrongly position the pulses, wrongly assign a power to the latter and consequently wrongly decode the reply. Now, the principle of the error detecting code cannot be used to correct errors spaced apart by more than 24 μs. From one mode S reply to the next, the errored bits are not the same, because the distortion of the pulses due to the beating between the forward wave and the reflected waves depends on the tread difference which changes sufficiently from recurrence to recurrence (10 ms).

The market, in the new uses of the mode S radars, increases the need to detect a target on the basis of few mode S interrogations, even over and above the need to have a good effectiveness indicator since:

the speed of rotation of the antenna of the surveillance radar is increased: often one revolution in four seconds for a range of 470 km. Consequently, the illumination time on a target is reduced and, because of this, the possibility of reinterrogating in case of failure is more limited, the mode S data transactions require illumination time on the target, so reducing the possible number of recurrences for a reinterrogation in the event of failure on the previous attempt. Military radars require additional interrogations in specific military modes (1 and 2), so further reducing the number of recurrences for the mode S.

The processing of replies from secondary radars performed by the Applicant since the 1990s has undergone two main developments, which are illustrated in the block diagrams of FIG. 6 (at the top and in the middle, respectively), as is the inventive solution (diagrammatically represented at the bottom of the figure). The secondary radars that implement these three different extraction techniques all have three main stages, corresponding to three main steps of the blip extraction process and represented in the same columns of the drawing: a radiofrequency processing stage 1, a signal processing stage 2 (hereinafter called SP) and a data processing stage 3 (hereinafter called DP). The stage 1 is the same for all three implementations. It essentially comprises a radar antenna 4, a receiver 5 and an interrogator 6. For stage 2, a number of successive quality detection and determination processing operations are diagrammatically represented, at the output of the receiver of each of the three methods, one under the other, corresponding to successive interrogations.

The two known techniques are:

1. "Reply Processing and Correlator R.P.C.". This is a secondary extractor developed between 1992 and 1999 and for which a number of patents have been filed, relating only to the innovative SSR (Secondary Surveillance Radar) processing, characterized by a strong discrimination capability based on the analysis of the form of the signals received on the Σ channel. The secondary processing principle is based on the systematic interrogation of all the targets present in the lobe at a rate of a dozen replies (6 in mode A and 6 in mode C) per target in the lobe. The main functionalities are managed as follows (see FIG. 6):

Space-time management (GST): this is managed by the elements 7 (pacing of the beam) and 8 (GST) and it is very simple since the sequencing systematically comprises interleaved mode A and mode C interrogations.

Signal processing (TS):

This detects and decodes the SSR replies on the basis of the analysis of the form of the signals received on the Σ channel, It establishes a quality constructed on the basis of the analysis of the Σ and Δ/Σ information.

Data processing—TD—(9) handles the extraction of the blip on the basis:

of the number of detections for each mode or for all modes to detect the blip, of the generation of the mode A/mode C codes by analysis of the codes obtained in each mode associated with their qualities and based on an estimator for each pulse of the code using the flags (flags giving the risks of garbling of a reply, therefore its potential to be correctly decoded).

The blocks of the diagram in the drawing show the degree of complexity of the various main functions reviewed hereinabove:

Space-time management (GST): low complexity,
Signal processing (TS): average complexity,
Data processing (TD): average complexity.

2. "Interrogator and Reply Processing" "I.R.P.". This is a secondary extractor developed between 1999 and 2005. A number of patents have been filed for the innovative mode S signal processing aiming for a strong discrimination capability based on histograms of the pulses defined by the analysis of the form of the signals received on Σ and on Δ, and another has been filed for the innovative mode S data processing in the sequencing of the mode S selective interrogations. The principle of the mode S processing is based on the selective interrogation of each target in the lobe at a rate of two replies per target in the lobe:

Space-time management (GST): this is managed by the elements 10 (pacing of the beam in mode S) and 11 (GST in mode S): this is highly sophisticated, since the sequencing is conditioned both by the principal sequencing selected by the operator within which should fall in real time all the selective interrogations and the placement of the listening windows associated with the replies expected from a chosen target (50 targets per lobe), Signal processing (TS): this is highly sophisticated:
  It detects the mode S pulses on the basis of the analysis of the form of the signals received on the Σ and Δ channels and pulse histogram,
  It establishes a constructed quality of each pulse on the basis of histograms of the Σ, Δ and Δ/Σ pulses,
  It handles the detection of the reply on the basis of the detected pulses,
  It handles the decoding of the reply message on the basis of the detected pulses and of the associated qualities for each bit of the message,
  It performs (in 12), independently for each reply, the calculation of the message error syndrome, and, if necessary, it tries to correct the message on the basis of the quality associated with each pulse.

Data processing (TD) simply handles (in 13) the association of the replies for a target that has already been isolated by the SP and the calculation of its general characteristics (power, azimuth, distance).

The blocks of the diagram in the drawing show the degree of complexity of the various main functions reviewed hereinabove:

Space-time management (GST): highly complex,

Signal processing (TS): highly complex,

Data processing (TD): low complexity.

Currently, the SP determines, for each detected reply, a reference value according to the three conventional variables (in SUM, in DIFFERENCE and in "MONOPULSE") and the maximum number of samples that are consistent with respect to this value for the three said variables, these samples hereinafter being called "consistent samples". This also indicates the overall quality of the reply: the higher this maximum number of consistent samples becomes, the clearer the overall quality becomes (unpolluted)

The decoding of each bit, and the quality (uncertainty as to its value), is established in relation to the position of the pulse or of the pulses in the period of the bit and of the value according to the three said variables of the pulse or pulses in relation to the value of the reply for these three variables.

The block diagram of FIG. 7 is, by way of example, a detail view of a few bits of the message. It shows the difficulty in decoding certain bits when the message is polluted by a number of multipaths:

the first line is a simplified representation of the signals received at the input of the receiver:
  the wanted signal of the reply
  a slightly weaker multipath offset by 500 ns
  a second weaker multipath offset by 800 ns
the second line shows, for the SUM pathway or the DIFFERENCE pathway, the signal at the output of the receiver that exploits the TS to define the presence of a pulse and its value. The broken line depicts the power of the reply calculated over all the pulses in a position to belong to the reply.
the bottom part of the figure gives a possible result of the TS relating to the establishment of the values of the pulse.

SUMMARY OF THE INVENTION

The subject of the present invention is a method of processing mode "S" replies from aircraft interrogated by a radar, making it possible to significantly reduce the multipath propagation effects, and which makes it possible to take into account each reply, whatever the spurious multipaths, and retain the contractual probability of detection (Pd), even in poor propagation conditions.

The processing method according to the invention is a method of processing replies from targets interrogated by a surveillance radar for interrogations in mode S, independently for each target present in the reception lobe of the radar, whereby the different targets present in the reception lobe of the radar SSR are interrogated at least once, all the reply signals received for this lobe for each target are collected after each interrogation, a reply detection processing operation is performed in a signal processing module and errors are detected and corrected and the corresponding blips are extracted, and it is characterized in that said signal quality detection and determination processing operation is implemented, in the event of decoding failure by the signal processing operation, by a data processing module which forms a synthetic message (value and quality of each bit of the mode S message) with the stored set of replies to each interrogation for one and the same target, establishing, for each bit of each message, the value and the quality of this bit and performing the detection and correction of errors using this synthetic message.

According to a characteristic of the invention, for each mode S reply:
  that is not decoded (correction attempt performed unsuccessfully by the TS),
  that could not be decoded (too many bad quality bits in an incorrect message to attempt the correction),
the signal processing module (TS) transmits:
  the value of the reply for the three output variables of the radar receiver (in SUM, in DIFFERENCE and in MONOPULSE) and the maximum number of samples consistent with this value for the three variables,
  for each pulse that is potentially in the position of each bit of the reply message, the value for said three variables and the number of associated samples, thus giving a pulse value quality indicator,
  information indicating the reply detection conditions.

According to another characteristic of the invention, as soon as at least two received replies are considered to be not decoded or not decodable by the signal processing module, the data processing module reconstructs a reply by carrying out the following steps:
  it establishes, for each bit of the mode S message, an estimator based on the analysis of the information from the potential pulses of the bit for all the received replies, such information being for each output variable from the radar receiver: the number of consistent samples in the reply, the reply quality flags, the value and the number of samples of each pulse, it decodes for each bit of the message the position of the pulse having the greatest value of the estimator and assigns a quality to each bit, always according to the value of the estimator and the presence of several pulses per bit, it detects the errors by exploiting the new decoding of the message, and if necessary, it tries to correct the bits of the message by exploiting the new qualities of each bit, as does the TS.

The invention therefore proposes to exploit in real time all the replies received overall and thus, by exploiting the non-stationarity of the pollution from reply to reply, make it possible to reconstruct a more accurate reply and establish a better quality of the bits of the message by taking the best pulses of each both on the SUM pathway and on the DIFFERENCE pathway and by also exploiting the "monopulse" information to establish the quality. The probability of obtaining a directly "reconstructed" reply that is correct is thus increased, as is, if necessary, the probability of being best able to correct it on the basis of the CRC thanks to a more accurate bit quality. The real time analysis of the received replies that cannot be corrected independently of each other, of the set of the latter at the level of each pulse makes it possible, immediately after the correction, to stop interrogating a given target and so considerably reduce (by a factor of 2 to 3) the number of mode S selective interrogations and therefore be able to deal with more other targets in the lobe.

According to another characteristic of the invention, for a radar operating at rotation speeds greater than approximately 4 s for a revolution, the All Call (AC) and Roll Call (RC) periods are eliminated in order to best distribute the radar time according to the nature of the targets present in the lobe of the radar. Advantageously, the mode S interrogations are then placed by taking into account the SSR blips present in the lobe.

BRIEF DESCRIPTION OF THE DRAWINGS

The present invention will be better understood from reading the detailed description of an embodiment, taken by way of nonlimiting example and illustrated by the appended drawing, in which.

DETAILED DESCRIPTION OF THE INVENTION

Figure 1:
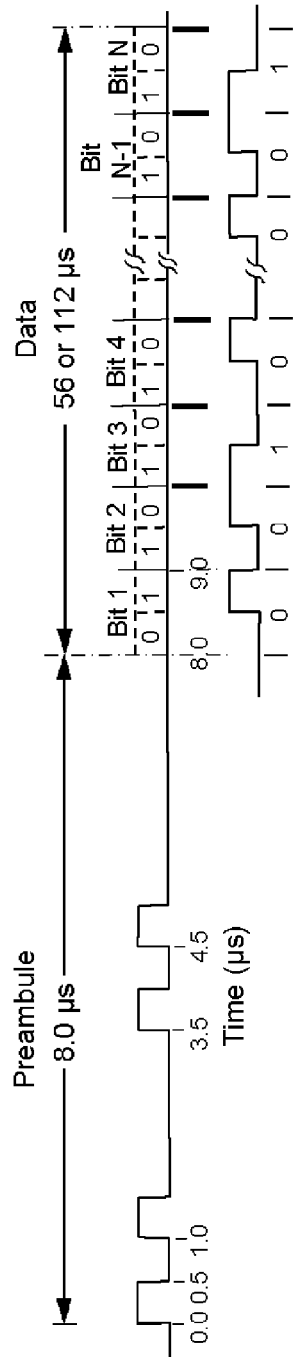
FIG. 1, mentioned hereinabove, is a timing diagram showing an exemplary mode S reply, FIG. 2, mentioned hereinabove, is a timing diagram showing examples of pollution of a mode S reply, FIGS. 3 to 5, mentioned hereinabove, are timing diagrams showing three characteristic examples of different pollutions of mode S replies.
Figure 2:
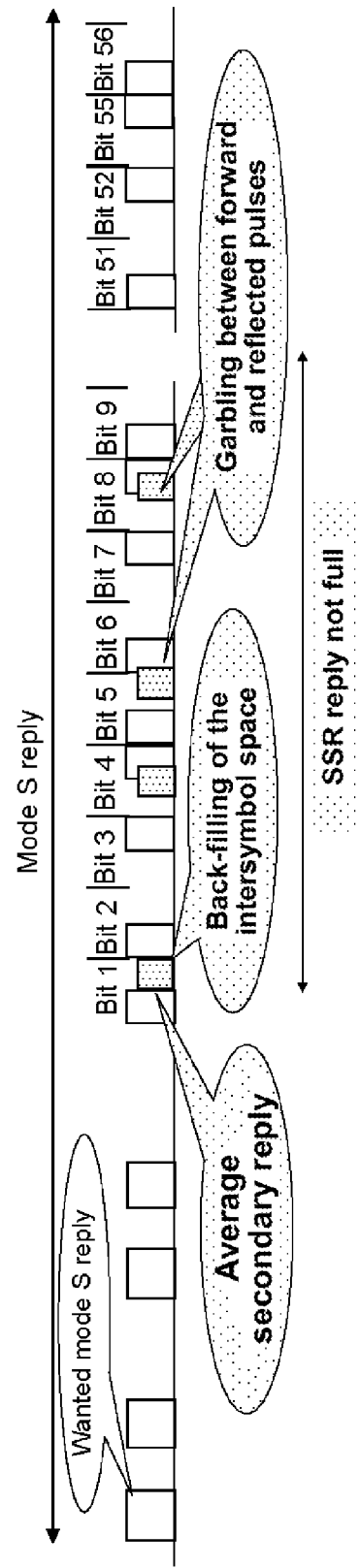
Figure 5:
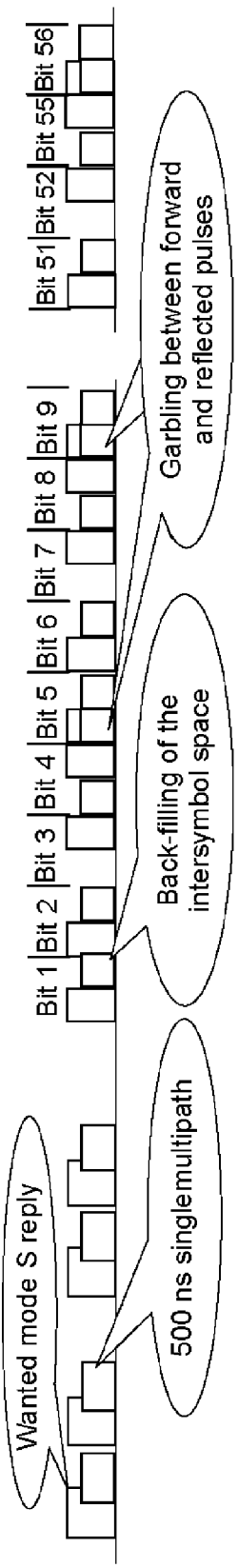
Figure 6:
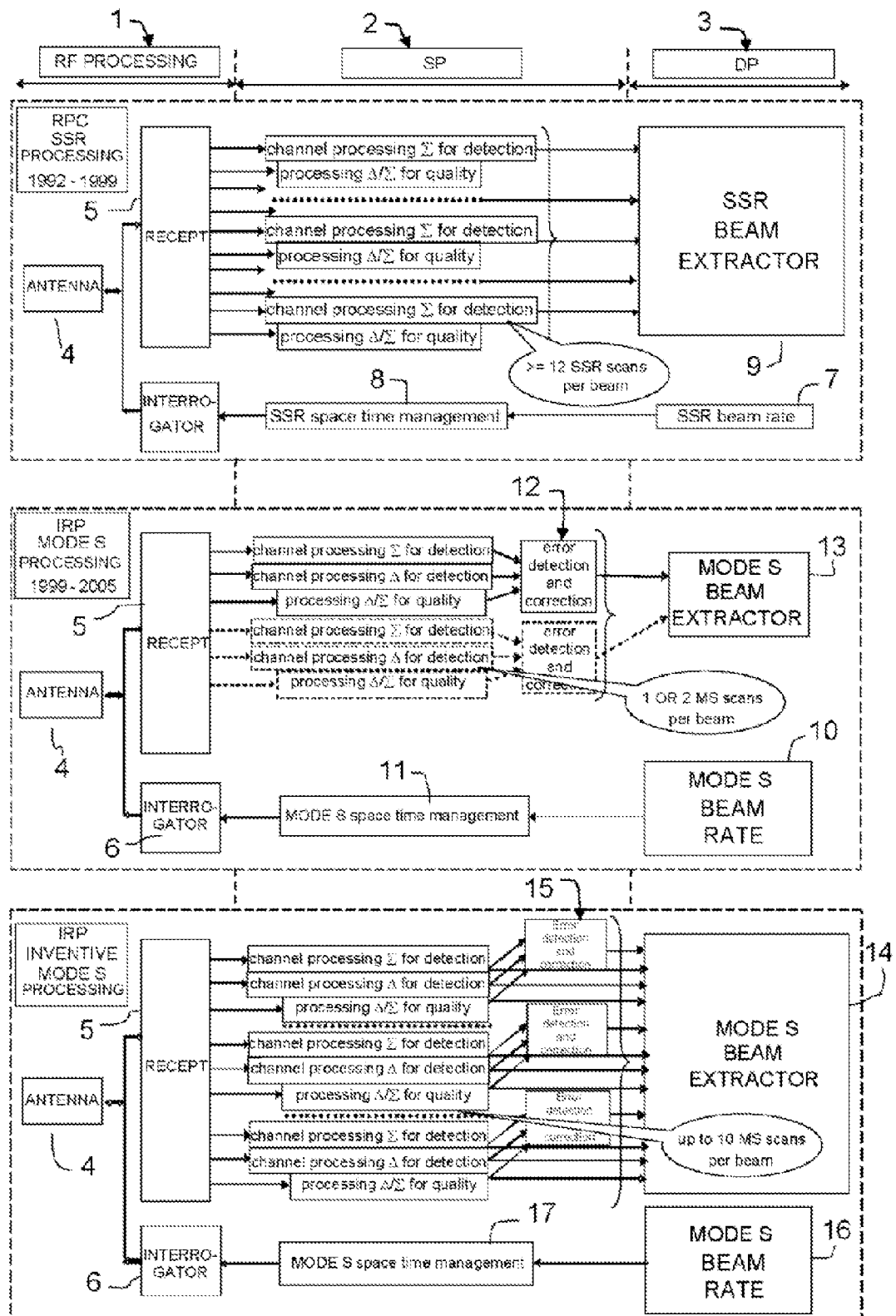
FIG. 6 is a block diagram in three parts, the first two, already described hereinabove and represented at the top and in the middle of the figure, relate to methods of the prior art, and the third, represented at the bottom of the figure, diagrammatically representing the main steps of the inventive method.
Figure 7:
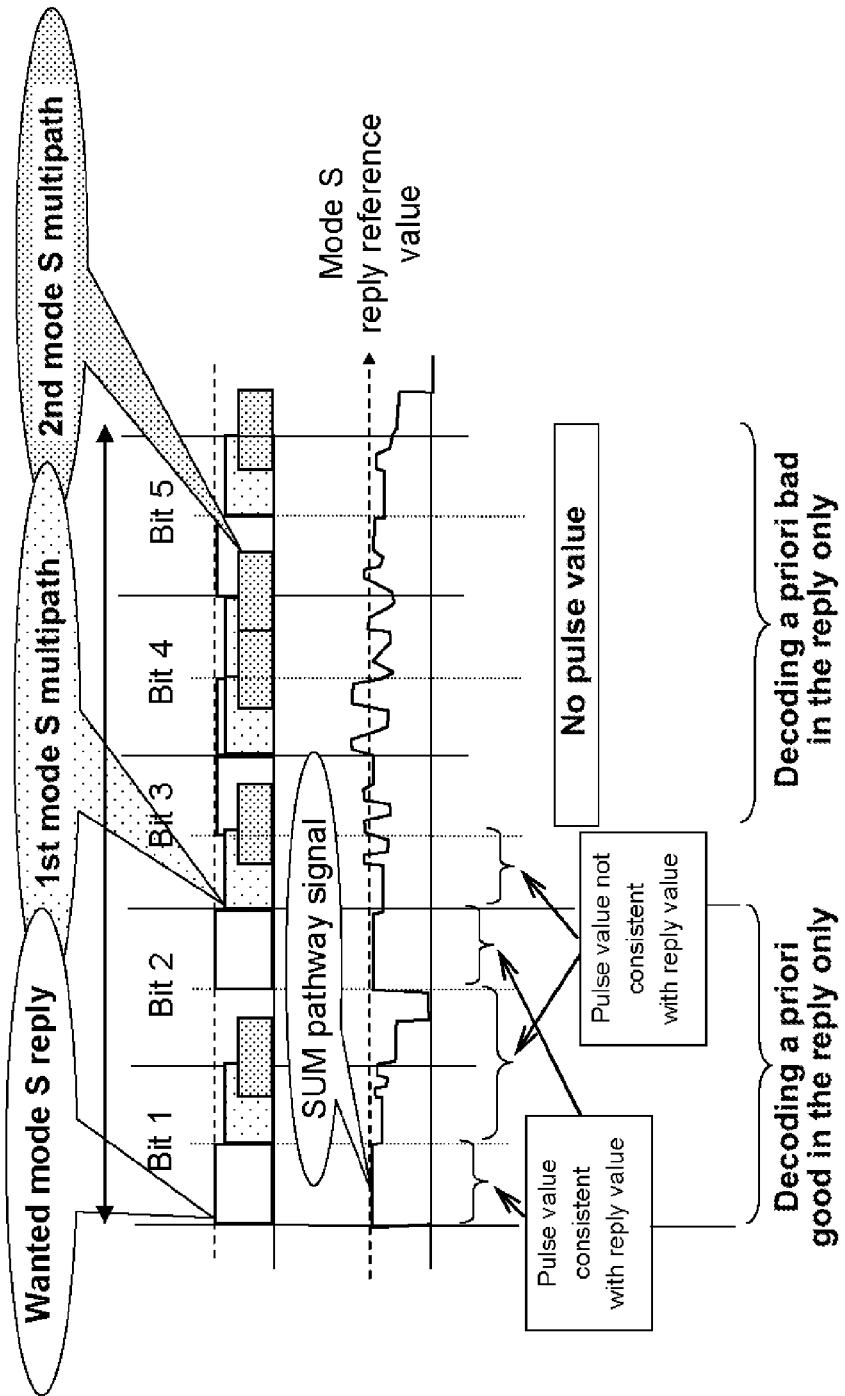
FIG. 7 is a timing diagram of a part of a mode S reply showing the problems encountered by the correction methods of the prior art.

The bottom part of FIG. 6, relating to the inventive method, shows, in the signal processing stage 2, a number of successive quality detection and determination processing sequences (the number of the latter is associated with successive decoding failures). A processing operation is performed to detect replies on the $\Sigma$ and $\Delta$ channels and a processing operation is performed to determine their quality for the $\Sigma$ and $\Delta$ channels, for the $\Delta/\Sigma$ information ("monopulse"), by taking into account the value of the $\Sigma$, $\Delta$ and $\Delta/\Sigma$ histograms. The results of these processing operations are sent to error detection and error correction circuits 15 and, in the event of failure, at the same time to a mode S extractor 14. The sequencing of the interrogations is controlled by a pacing device 16 and a mode S GST device 17.

Figure 8:
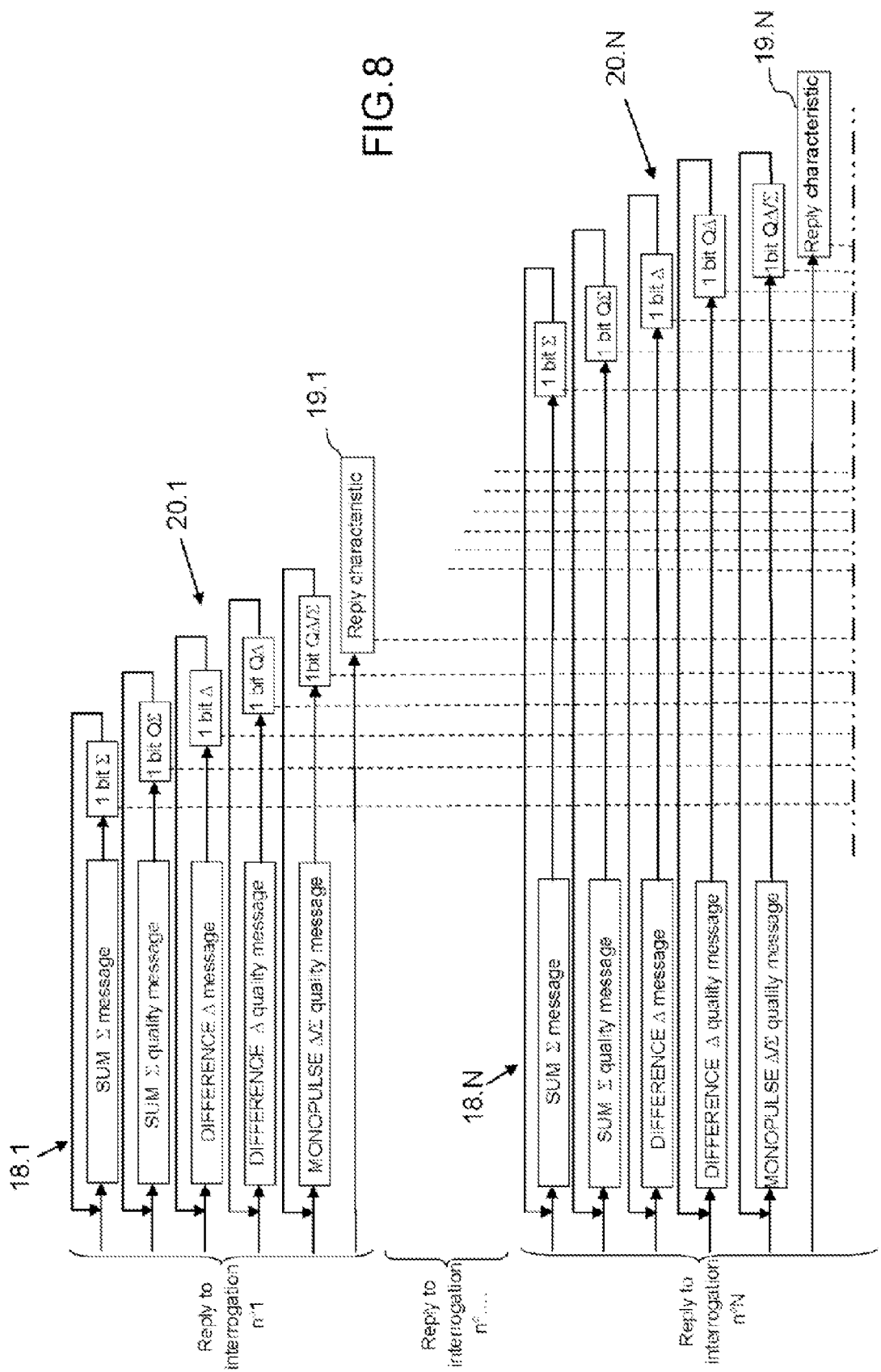
FIG. 8 is a block diagram of a device implementing the invention corresponding to a part of the "MODE S BEAM EXTRACTOR" function of FIG. 6.
Figure 8:
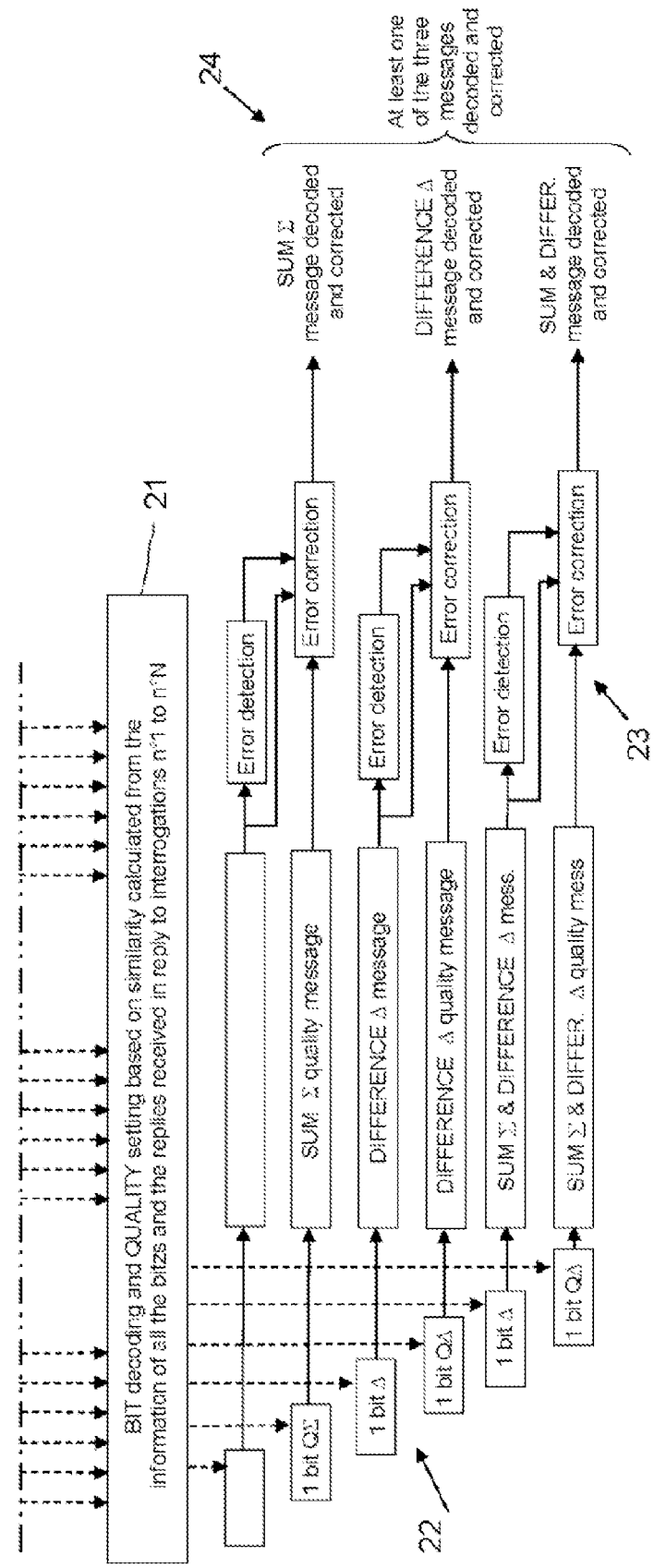

There now follows a description, with reference to FIG. 8, of the processing operation according to the invention when a number of replies cannot be decoded because of pollution. The signal processing (TS) stage 2 delivers, for each selective reply generated (up to 5 to 10 per lobe), the following message information (18.1 to 18.N) (identical for the series of replies 1 to N, since the question asked, and consequently the reply received, is always the same as long as there is failure):

the number of bits present in the message (consisting of 56 or 112 bits):
  for the $\Sigma$ channel,
  for the $\Delta$ channel,
the quality of these same bits:
  for the $\Sigma$ channel,
  for the $\Delta$ channel,
  for the $\Delta/\Sigma$ monopulse information,
the overall characteristics of the reply (19.1 to 19.N): result of the $\Sigma$, $\Delta$, $\Delta/\Sigma$ histograms, value, maximum number of samples consistent with the expected value, "garbling" (pollution) indicators, etc.

This information is stored in shift registers that can be looped back (20.1 to 20.N) to reread the data without losing it. For each potential pulse of the message (that is, for its theoretical position plus or minus the tolerance allowed on this position), an estimator is established (21) that exploits all the preceding information for each of the variables (in SUM, in DIFFERENCE and in MONOPULSE) of all the received replies. The following information is deduced therefrom for each bit of the message:

the value of the bit following the position of the pulse having the greatest value determined by the estimator, the quality associated with each bit, always according to the value assigned by the estimator and the presence of a number of pulses per bit (22).

Then, the procedure continues conventionally, as is done at the signal processing level to detect the errors (23) by exploiting these new synthesis messages generated on the set of replies available from the lobe. If necessary, an attempt is made to correct the bits of the message by exploiting the new qualities of each bit (this is also the same function as that of the TS). Finally, decoded messages are obtained (24) for the three said variables.

To increase the possibilities of success, the attempt to decode the message can be performed independently:
  on the two variables SUM and MONOPULSE
  on the two variables DIFFERENCE and MONOPULSE
  on all three variables SUM, DIFFERENCE and MONOPULSE
  to exploit the non-stability characteristics of the pollution, if, for example, the multipath is offset in azimuth in the lobe.

If none of the three decodings and corrections is successful, a new interrogation must be made. If once again the reply obtained is not corrected by the TS, the TD process described hereinabove is repeated in full on the basis of the three replies, and so on until successful.

The success of this new decoding by the TD makes it possible to reduce the number of selective interrogations required, so making it possible to reduce the use of the transmitter, the duty cycle of which is limited, which prevents saturation due to the load when the antenna lobe illuminates a large number of aircraft. This also makes it possible to schedule more aircraft in the subsequent "Roll Call" periods and pick up mode S aircraft more quickly (with a probability PR of picking up a reply such that PR=1) on starting up a radar station (currently PR=0.5).

Thus, because the message decoding processing operation exploits all the replies received, it provides a way of best exploiting the non-stability of the pollution which has caused the decoding of each reply taken separately to fail.

Consequently, the inventive method significantly increases the chances of correctly decoding the message, because the garblings and multipaths observed are not stable from reply to reply and it is therefore not always the same bits of the message that are badly decoded. Therefore, the inventive method makes it possible, without generating any additional interrogation, to decode a new reply message a priori of better quality than that of each reply received individually.

The inventive processing is useful for highly polluted electromagnetic environments where the existing methods are inadequate: the same target may be asked the question again for reasons other than a reply failure.

According to one characteristic of the invention, if the real time processing offers sufficient power, it can be applied as and when needed in the lobe and thus make it possible to make only the necessary number of selective interrogations as soon as the preceding replies that have been exploited transversally make it possible to generate a correct or correctable message. This then makes it possible to deal with a far bigger number of different targets. Otherwise, without added computation power, at the lobe end, it is possible to exploit, not in real time, the replies received and so have an additional chance of decoding the message if this has not taken place for one of the replies from the lobe.

The message decoding processing operation exploiting all the replies received makes it possible to best exploit the non-stability of the pollution which caused the decoding of each reply to fail separately, such as the "garbling" pollution by SSR asynchronous replies, multipaths which, from reply to reply, are not constant as a result of the displacement of the airplane distance-wise (the step difference changes, and therefore the beat between the forward wave and the reflected wave gives a different signal, not to mention the possibility of modifying the reflector).

Moreover, the initial use of the mode S protocol on IFF military radars revolving at higher rotation speeds (1, 2 or 4 seconds/revolution) and needing to retain a compatibility for the conventional SIF modes (modes 1 and 2) but also the requests from civil radars capable of "datalink" performance at high rotation speeds (4 sec/rev) reveal that the conventional sequencing proposed by the FAA, EUROCONTROL or STANAG is no longer appropriate. Indeed, for radars with high rotation speeds, the rigid sequencing based on "All Call" (AC) and "Roll Call" (RC) periods limits both the number of SIF interrogations in the lobe, and also the periods allocated to the selective mode S transmissions for the datalink.

Since the IFF antennas are not electronic scanning antennas, the illumination time of the target is directly linked to the rotation speed of the radar. The rigid allocation of the periods for the different protocols (AC for SIF and RC for mode S) does not allow the radar to be adapted to the nature and the quantity of the SSR/SIF or mode S targets present in the lobe.

According to an advantageous application of the invention, it is proposed to no longer rigidly allocate the AC and RC periods. Thus, by mixing the two protocols, the radar time can be optimized according to the targets present in the lobe (SIF or mode S) and according to the types of interrogations required (SIF or mode S datalink). To avoid the garblings either between the mode S interrogations and the SIF replies, or between the mode S replies and the SIF replies, the placement of the mode S interrogations takes into account the predicted positions of the SIF replies in a manner similar to that done for the placement of the mode S replies between themselves in the RC periods.

Nevertheless, in areas filled with aircraft, the probability that a mode S reply is polluted by one or more SSR replies (synchronous or asynchronous) is fairly high. Indeed, it will not always be possible to interleave the mode S transactions (interrogations and replies) among the SSR synchronous transactions (interrogations and replies), since the latter, depending on the distance and azimuth distribution of the aircraft, can form a block of replies that is so locally dense that it is not possible to interleave and it is essential to make the mode S replies overlap with the synchronous SSR replies.

In such cases, the present invention provides a way of exploiting the non-stationarity of these overlap cases and thus decoding the mode S replies, and therefore allows the elimination of the AC and RC periods to be put into practice to optimize the radar time according to the nature of the targets.

The invention claimed is:

1. A method of processing replies from targets interrogated by a surveillance radar for interrogations in mode S, independently for each target present in the reception lobe of the radar, whereby the different targets present in the reception lobe of the radar SSR are interrogated at least once, all the reply signals received for this lobe for each target are collected after each interrogation, a reply detection processing operation is performed in a signal processing module and errors are detected and corrected and the corresponding blips are extracted, wherein said signal quality detection and determination processing operation is implemented, in the event of decoding failure by the signal processing operation, by a data processing module which forms a synthetic message with the stored set of replies to each interrogation for one and the same target, establishing, for each bit of each message, the value and the quality of this bit and performing the detection and correction of errors using this synthetic message.

2. The method as claimed in claim 1, wherein the synthetic message comprises the value and the quality of each bit of the mode S message.

3. The method as claimed in claim 1, wherein, for each mode S reply that is not decoded following a correction attempt performed unsuccessfully by the signal processing operation, or that could not be decoded because of an excessive number of bad quality bits in an incorrect message to attempt the correction, the signal processing module transmits:

the value of the reply for the three output variables of the radar receiver (SUM, DIFFERENCE and MONOPULSE) and the maximum number of samples consistent with this value for the three variables, for each pulse that is potentially in the position of each bit of the reply message, the value for said three variables and the number of associated samples, thus giving a pulse value quality indicator, information indicating the reply detection conditions.

4. The method as claimed in claim 1 wherein, as soon as at least two received replies are considered to be not decoded or not decodable by the signal processing module, the data processing module reconstructs a reply by carrying out the following steps:

it establishes, for each bit of the mode S message, an estimator based on the analysis of the information from the potential pulses of the bit for all the received replies, such information being for each output variable from the radar receiver: the number of consistent samples in the reply, the reply quality flags, the value and the number of samples of each pulse, it decodes for each bit of the message the position of the pulse having the greatest value of the estimator and assigns a quality to each bit, always according to the value of the estimator and the presence of several pulses per bit, it detects the errors by exploiting the new decoding of the message.

5. The method as claimed in claim 1, wherein, when it is possible and necessary to correct a message, the data processing module tries to correct the bits of the message by exploiting the new qualities of each bit.

6. The method as claimed in claim 3, wherein, to increase the possibilities of success, the attempt to decode the message is performed independently:

on the two variables SUM and MONOPULSE,
on the two variables DIFFERENCE and MONOPULSE,
on all three variables SUM, DIFFERENCE and MONOPULSE to best exploit the characteristics of the pollution (amplitude, misalignment, absence of time stability, etc.) since it is sufficient for one success out of the three attempts for the mode S message to be considered to be correctly decoded.

7. The method as claimed in claim 1, wherein, when there is sufficient real time computation power available, the number of selective interrogations is reduced by exploiting those already received in real time in each lobe.

8. The method as claimed in claim 1, wherein, at the end of a lobe, the received replies are exploited, not in real time, to be able to decode the message if this was not done for one of the replies from the lobe.

9. The method as claimed in claim 1, wherein, for a radar operating at rotation speeds greater than approximately 4 s for a revolution, the All Call and Roll Call periods are eliminated in order to best distribute the radar time according to the nature of the targets present in the lobe of the radar.

10. The method as claimed in claim 9, wherein the interrogations in mode S are placed by taking into account the set of the SSR/SIF blips present in the lobe.

* * * * *